US012657859B2

(12) United States Patent
Yu et al.

(10) Patent No.: US 12,657,859 B2
(45) Date of Patent: Jun. 16, 2026

(54) METHOD AND DEVICE WITH IMAGE PROCESSING

(71) Applicants: Samsung Electronics Co., Ltd., Suwon-Si (KR); Korea University Research and Business Foundation, Seoul (KR)

(72) Inventors: Junsang Yu, Dongjak-gu (KR); Jong Ok Kim, Seoul (KR); Kang Kyu Lee, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 903 days.

(21) Appl. No.: 17/720,626

(22) Filed: Apr. 14, 2022

(65) Prior Publication Data
US 2023/0078522 A1 Mar. 16, 2023

(30) Foreign Application Priority Data
Sep. 15, 2021 (KR) ........................ 10-2021-0123322

(51) Int. Cl.
*G06V 10/145* (2022.01)
*G06V 10/56* (2022.01)
*G06V 10/82* (2022.01)

(52) U.S. Cl.
CPC ............ *G06V 10/145* (2022.01); *G06V 10/56* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 11,245,856 B2 | 2/2022 | Kim et al. | |
| 11,436,440 B2 | 9/2022 | Gvsl et al. | |
| 2016/0372080 A1 | 12/2016 | Abe et al. | |
| 2020/0244933 A1 | 7/2020 | Shimizu et al. | |

FOREIGN PATENT DOCUMENTS

| | | | | |
|---|---|---|---|---|
| CN | 105208362 B | * | 8/2017 | |
| CN | 105721845 B | * | 6/2018 | ........... G06K 9/4652 |
| CN | 111968044 A | | 11/2020 | |
| CN | 111986273 A | | 11/2020 | |
| CN | 112272832 A | | 1/2021 | |
| JP | 2017-187994 A | | 10/2017 | |

(Continued)

OTHER PUBLICATIONS

Learning to Separate Multiple Illuminants in a Single Image, Hui et al., 2019, CVPR.*

(Continued)

*Primary Examiner* — Fan Zhang
(74) *Attorney, Agent, or Firm* — NSIP Law

(57) ABSTRACT

A device with image processing includes: an image acquirer configured to acquire a plurality of images each having a different brightness; and one or more processors configured to extract an illumination map for an input image of the images and an illuminant color of the input image from the input image and temporal correlation information of the plurality of images, based on an illumination extraction model.

22 Claims, 14 Drawing Sheets

(56) References Cited

FOREIGN PATENT DOCUMENTS

| KR | 10-0695129 B1 | | 3/2007 |
|---|---|---|---|
| KR | 101653353 B1 | * | 9/2016 |
| KR | 10-2019-0058936 A | | 5/2019 |
| KR | 10-2019-0059442 A | | 5/2019 |
| KR | 10-2020-0101786 A | | 8/2020 |
| KR | 20200101786 A | * | 8/2020 |
| WO | WO 2016/175234 A1 | | 11/2016 |

OTHER PUBLICATIONS

Laffont et al; Intrinsic Decomposition of Image Sequences from Local Temporal Variations, 2015.*

Seo, Kouki, et al, "Deep Retinex Network for Estimating Illumination Colors with Self-Supervised Learning." 2021 IEEE 3rd Global Conference on Life Sciences and Technologies (Life Tech). IEEE, 2021., (5 pages).

Shi, Lei, et al., "Face Anti-Spoofing Using Spatial Pyramid Pooling." 2020 25th International Conference on Pattern Recognition (ICPR). IEEE, 2021., (12 pages).

Ha, Jeong-Won, et al, "Deep Color Constancy Using Temporal Gradient Under AC Light Sources." ICASSP 2021-2021 IEEE International Conference on Acoustics, Speech and Signal Processing (ICASSP). IEEE, 2021., (11 pages).

Korean Office Action issued on Aug. 12, 2024, in counterpart Korean Patent Application No. 10-2021-0123322 (3 pages in English, 6 pages in Korean).

Baslamisli, Anil S., et al. "CNN based Learning using Reflection and Retinex Models for Intrinsic Image Decomposition." *Proceedings of the IEEE Conference on Computer Vision and Pattern Recognition arXiv:1712.01056v2* Apr. 3, 2018 (10 pages in English).

Wei, Chen, et al. "Deep Retinex Decomposition for Low-Light Enhancement." *Institute of Computer Science and Technology arXiv:1808.04560v1* Aug. 14, 2018 (12 pages in English).

Fan, Minhao, et al. "Integrating Semantic Segmentation and Retinex Model for Low-Light Image Enhancement." *Proceedings of the 28th ACM International Conference on Multimedia* Oct. 12-16, 2020 (9 pages in English).

Li, Miao, et al. "AMBCR: Low-light image enhancement via attention guided multi-branch construction and Retinex theory." *IET Image Processing vol. 15 Article 9 DOI: 10.1049/ipr2.12173* Feb. 23, 2021 (19 pages in English).

Ma, Tian, et al. "RetinexGAN: Unsupervised Low-Light Enhancement with Two-Layer Convolutional Decomposition Networks." *IEEE Access vol. 9* Apr. 19, 2021 (12 pages in English).

Vaswani, Ashish, et al. "Attention Is All You Need." Advances in neural information processing systems 30, 2017, (11 pages in English).

Wang, Wencheng, et al. "An Experiment-Based Review of Low-Light Image Enhancement Methods." IEEE Access 8 (2020): 87884-87917.

Extended European search report issued on Feb. 7, 2023, in counterpart European Patent Application No. 22188688.0 (10 pages in English).

Yoo, Jun-Sang, et al., "Dichromatic Model Based Temporal Color Constancy for AC Light Sources", Proceedings of the IEEE/CVF Conference on Computer Vision and Pattern Recognition, 2019, (10 Pages in English).

Yoo, Jun-Sang, et al., "Deep Dichromatic Model Estimation Under AC Light Sources", IEEE Transactions on Image Processing, vol. 30, 2021, (10 Pages in English).

Chinese Office Action Issued on Mar. 26, 2025, in Counterpart Chinese Patent Application No. 202210585609.4 (11 Pages in English, 7 Pages in Chinese).

* cited by examiner 620      632      633

Weighted sum

METHOD AND DEVICE WITH IMAGE PROCESSING

CROSS-REFERENCE TO RELATED APPLICATIONS

This application claims the benefit under 35 USC § 119(a) of Korean Patent Application No. 10-2021-0123322, filed on Sep. 15, 2021 in the Korean Intellectual Property Office, the entire disclosure of which is incorporated herein by reference for all purposes.

BACKGROUND

1. Field

The following description relates to a method and device with image processing.

2. Description of Related Art

As a way to solve an issue of classifying an input pattern into a specific group, an efficient pattern recognition method may be applied to an actual computer. To solve an issue of classifying an input pattern into a specific group, a neural network may use a method that has a learning ability. Through this method, the neural network may generate mapping between an input pattern and an output pattern, which may be expressed as the neural network having the learning ability. Also, the neural network may have a generalization ability of generating a relatively correct output for an input pattern that is not used for learning based on learning results.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a device with image processing includes: an image acquirer configured to acquire a plurality of images each having a different brightness; and one or more processors configured to extract an illumination map for an input image of the images and an illuminant color of the input image from the input image and temporal correlation information of the plurality of images, based on an illumination extraction model.

The image acquirer may be configured to acquire the plurality of images including one or more images having a brightness different from that of the input image.

For the extracting of the illumination map and the illuminant color, the one or more processors may be configured to: reshape data generated from the plurality of images based on a temporal frame by compressing color channels of the plurality of images into a single channel; and determine temporal correlation information from attention data generated from the reshaped data and the plurality of images.

For the extracting of the illumination map and the illuminant color, the one or more processors may be configured to: extract a color map for each color channel from the input image using one or more convolution layers of the illumination extraction model; and determine an illuminant color vector indicating the illuminant color based on the extracted color map for each color channel and an illuminant confidence map.

The one or more processors may be configured to generate a reflectance map from the input image using the illumination map and the illuminant color vector.

The one or more processors may be configured to generate a temporal gradient map as the illuminant confidence map by accumulating a difference for each temporal frame pixel by pixel from the plurality of images.

The one or more processors may be configured to: generate another illumination map using the input image and a reflectance map; and generate illuminant correlation information between the illumination map and the other illumination map as the illuminant confidence map.

The illumination extraction model may include a pyramid pooling layer of propagating, to a subsequent layer, output data in which a result of performing an individual convolution operation on data pooled with different sizes to input data is concatenated to the input data.

The one or more processors may be configured to generate a white balanced image from the input image using the extracted illuminant color.

The one or more processors may be configured to extract, from the input image, a reflectance map for a same temporal frame as a temporal frame of the illumination map based on a reflectance extraction model.

The one or more processors may be configured to share feature data extracted from at least a portion of layers of the reflectance extraction model with the illumination extraction model.

The image acquirer may be configured to acquire the plurality of images captured under an alternating current (AC) illuminant.

The image acquirer may be configured to acquire each of the plurality of images at a different exposure time.

The processor may be configured to: generate a plurality of illumination maps corresponding to respective temporal frames from the plurality of images using the illumination extraction model; generate a plurality of reflectance maps corresponding to the respective temporal frames from the plurality of images using a reflectance extraction model; and generate a composite image from the plurality of illumination maps and the plurality of reflectance maps.

The processor may be configured to reconstruct a high dynamic range (HDR) image from the plurality of illumination maps and the plurality of reflectance maps based on an image fusion model.

In another general aspect, a method with image processing includes: acquiring a plurality of images each having a different brightness; and extracting an illumination map for an input image of the images and an illuminant color of the input image from the input image and temporal correlation information of the plurality of images, based on an illumination extraction model.

The extracting of the illumination map and the illuminant color may include: reshaping data generated from the plurality of images by compressing color channels of the plurality of images into a single channel, based on a temporal frame; and determining temporal correlation information from attention data generated from the reshaped data and the plurality of images.

The extracting of the illumination map and the illuminant color may include: extracting a color map for each color channel from the input image using one or more convolution layers of the illumination extraction model; and determining an illuminant color vector indicating the illuminant color based on the extracted color map for each color channel and an illuminant confidence map.

The extracting of the illumination map and the illuminant color may include propagating, from a pyramid pooling layer of the illumination extraction model to a subsequent layer, output data in which a result of performing an individual convolution operation on data pooled with different sizes to input data is concatenated to the input data.

The method may include training the illumination extraction model based on a loss determined based on either one or both of the illumination map and the illuminant color.

In another general aspect, one or more embodiments include a non-transitory computer-readable storage medium storing instructions that, when executed by one or more processors, configure the one or more processors to perform any one, any combination, or all operations and methods described herein.

In another general aspect, a method with image processing includes: extracting an illumination map and an illuminant color of an input image among a plurality of images each having a different brightness, using an illumination extraction model; determining an illuminant color vector of the illuminant color based on a color map extracted for each color channel from the input image using a portion of the illumination extraction model; extracting a reflectance map of the input image based on the illumination map and the illuminant color vector; and generating a white balanced image of the input image based on the illumination map and the reflectance map.

The extracting of the reflectance map may include applying an element-wise division to the input image using the illumination map and the illuminant color vector.

The illumination extraction model may include an encoder portion and a decoder portion, and the color map extracted for each color channel from the input image is output from a convolutional layer of the encoder portion.

Other features and aspects will be apparent from the following detailed description, the drawings, and the claims.

4

Figure 1:
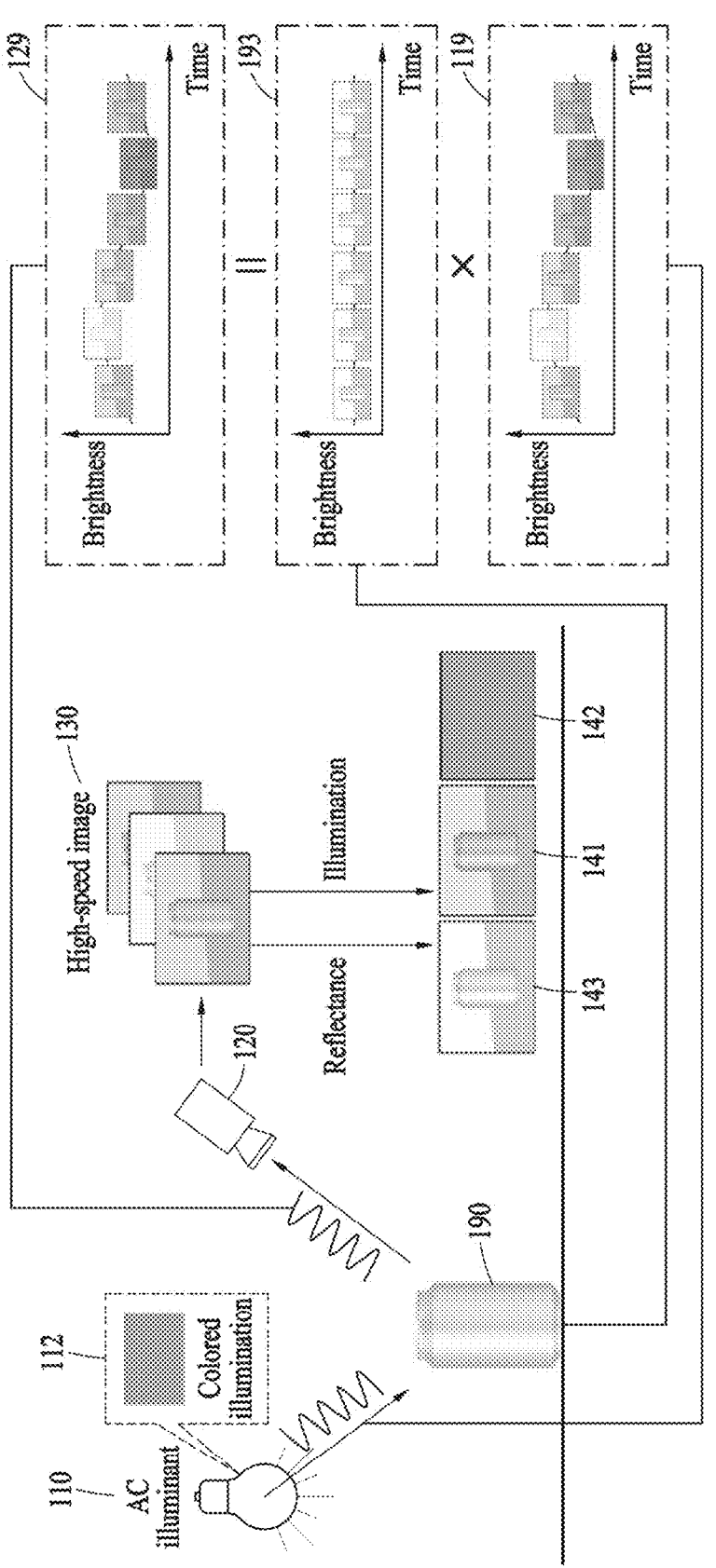
FIG. 1 illustrates an example of decomposing an image captured under an illumination.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first," "second," and the like are used to explain various members, components, regions, layers, or sections, these members, components, regions, layers, or sections are not limited to such terms. Rather, these terms are used only to distinguish one member, component, region, layer, or section from another member, component, region, layer, or section. For example, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "include," "comprise," and "have," when used in this specification, specify the presence of stated features, integers, steps, operations, elements, components, and/or a combination thereof, but do not preclude the presence or addition of one or more other features, integers, steps, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined herein, all terms used herein including technical or scientific terms have the same meanings as those generally understood by one of ordinary skill in the art to which this disclosure pertains after and understanding of the present disclosure. Terms defined in dictionaries generally used should be construed to have meanings matching contextual meanings in the related art and the present disclosure, and are not to be construed as an ideal or excessively formal meaning unless otherwise defined herein.

Hereinafter, the examples are described in detail with reference to the accompanying drawings. Like reference numerals illustrated in the respective drawings refer to like elements and further description related thereto is omitted.

FIG. 1 illustrates an example of decomposing an image captured under an illumination.

In an example, an image 130 may be decomposed into an illumination map 141 and a reflectance map 143 according to Retinex theory. The illumination map 141 may refer to a map that expresses a level of light incident from an illuminant 110 to an object 190 and/or a background. For example, an element value corresponding to each pixel of the image 130 in the illumination map 141 may represent intensity of light incident to a point corresponding to a corresponding pixel in a scene captured in the image 130. The reflectance map 143 refers to a map that expresses a level at which the object 190 and/or the background reflects the incident light. For example, an element value corresponding to each pixel of the image 130 in the reflectance map 143 may represent a reflectance coefficient of a point corresponding to a corresponding pixel in the scene captured in the image 130. Each element value of the reflectance map 143 may represent a reflectance coefficient for each color channel according to a color space and may represent a level of reflection of light with a wavelength corresponding to a color of a corresponding color channel. For example, in the case of an RGB color space, the reflectance map 143 may include an element value indicating a reflectance coefficient in a red channel, an element value indicating a reflectance coefficient in a green channel, and an element value indicating a reflectance coefficient in a blue channel, for each pixel. Also, in addition to the illumination map 141 and the reflectance map 143, an image processing device may extract an illuminant color 142 indicating a color 112 of the illuminant 110 from the image 130.

When only a brightness varies while capturing a plurality of images for the same scene, the illumination map 141 may be variant and the reflectance map 143 may be invariant (for temporal frames, for example). For example, each of a series of images captured in consecutive frames may have a different brightness. For example, illumination intensity of the illuminant 110 (hereinafter, also referred to as the alternating current (AC) illuminant 110) that operates with AC power may vary according to a frequency of the AC power. When the AC power supplies sinusoidal power with a frequency of 60 hertz (Hz), the illumination intensity of the AC illuminant 110 may increase and a brightness may increase although the AC power has a negative value. That is, the AC illuminant 110 with the AC power of 60 Hz may change the brightness to 120 Hz. The brightness change to 120 Hz may be captured by a high-speed camera 120.

According to the Retinex theory, for example, each of a plurality of images in consecutive frames captured using the high-speed camera 120 under the AC illuminant 110 may be decomposed into the consistent (or invariant) reflectance map 143 and the illumination map 141 having a variant brightness for each temporal frame. That is, the image 130 captured by the high-speed camera 120 may show a sinusoidal brightness change 129 along a time axis, the reflectance map 143 may show constant invariance 193 along the time axis, and the illumination map 141 may show a sinusoidal brightness change 119 along the time axis. The captured image 130 may be represented as a multiplication of the illumination map 141 and the reflectance map 143 for each temporal frame. As described above, since the reflectance map 143 shows the constant invariance 193 along the time axis, the brightness change 129 of the image 130 along the time axis may depend on the brightness change 119 of the illumination map 141. Since the brightness change by the AC illuminant 110 is sinusoidal, such constraint showing the sinusoidal brightness change even in the captured image 130 may be used to more accurately predict the illumination map 141.

An image processing device of one or more embodiments may estimate (e.g., determine) the illumination map 141, the reflectance map 143, and the illuminant color 142 from the image 130 based on an image decomposition model that is accurately trained or learned using loss functions designed in consideration of the aforementioned constraint (e.g., the sinusoidal brightness change is shown in the captured image 130). For example, the image processing device may generate temporal correlation information that represents the brightness change of the AC illuminant 110 for a plurality of images. The image processing device may perform an image decomposition using the generated temporal correlation information and a single input image among the plurality of images. A non-limiting example of the image decomposition is further described below with reference to FIG. 2 and a non-limiting example of training of the image decomposition model and a loss function are further described below with reference to FIG. 10.

The illumination map 141, the reflectance map 143, and the illuminant color 142 may be estimated in a complex manner from the image decomposition model that is trained using loss functions designed based on the brightness change 119 of the illumination map 141 and the invariance 193 of the reflectance map 143 for each temporal frame in the aforementioned brightness change of the AC illuminant 110. When temporal correlation information as well as consistency of the reflectance map 143 is used, the image processing device of one or more embodiments may perform a more accurate image decomposition. For example, the image decomposition model may learn a temporal characteristic and a gradient of the AC illuminant 110 using a brightness change characteristic of the AC illuminant 110. When the illuminant color 142 is estimated without assuming a white illumination, the image processing device of one or more embodiments may more accurately estimate the illumination map 141 and the reflectance map 143. The image processing device of one or more embodiments may prevent a degradation in complex decomposition performance caused by a color distortion and an illumination brightness (e.g., low illuminance) by an illumination color.

In the image processing device of one or more embodiments, the image decomposition model may include an illumination extraction model and a reflectance extraction model, and an output result of the illumination extraction model may be used as training data to train the reflectance extraction model. Vice versa, an output result of the reflectance extraction model may be used as training data to train the illumination extraction model. Therefore, although manual labeling of a person is limited, a large amount of training data may be acquired.

For reference, the image processing device of one or more embodiments is not limited to decomposing only the image 130 captured with the high-speed camera 120. Since a general camera with an adjusted capturing cycle and/or exposure time may capture a portion of the brightness change, the aforementioned method may also apply. For example, even the image 130 captured at a frame per second (FPS) different from an illumination cycle of the AC illuminant 110 may include a brightness change similar to that of the image 130 captured with the high-speed camera 120. When the general camera with a fixed exposure time acquires multi-frame images, the brightness may vary in the captured image 130 although the cycle of the AC illuminant 110 is not given. Also, for the AC illuminant 110, a brightness change of an AC waveform may be predicted and a brightness change according to a multi-exposure time may be predicted as a linear change. Therefore, similarly, even for images captured at the multi-exposure time, temporal correlation information may be used for image decomposition based on the Retinex theory.

Figure 2:
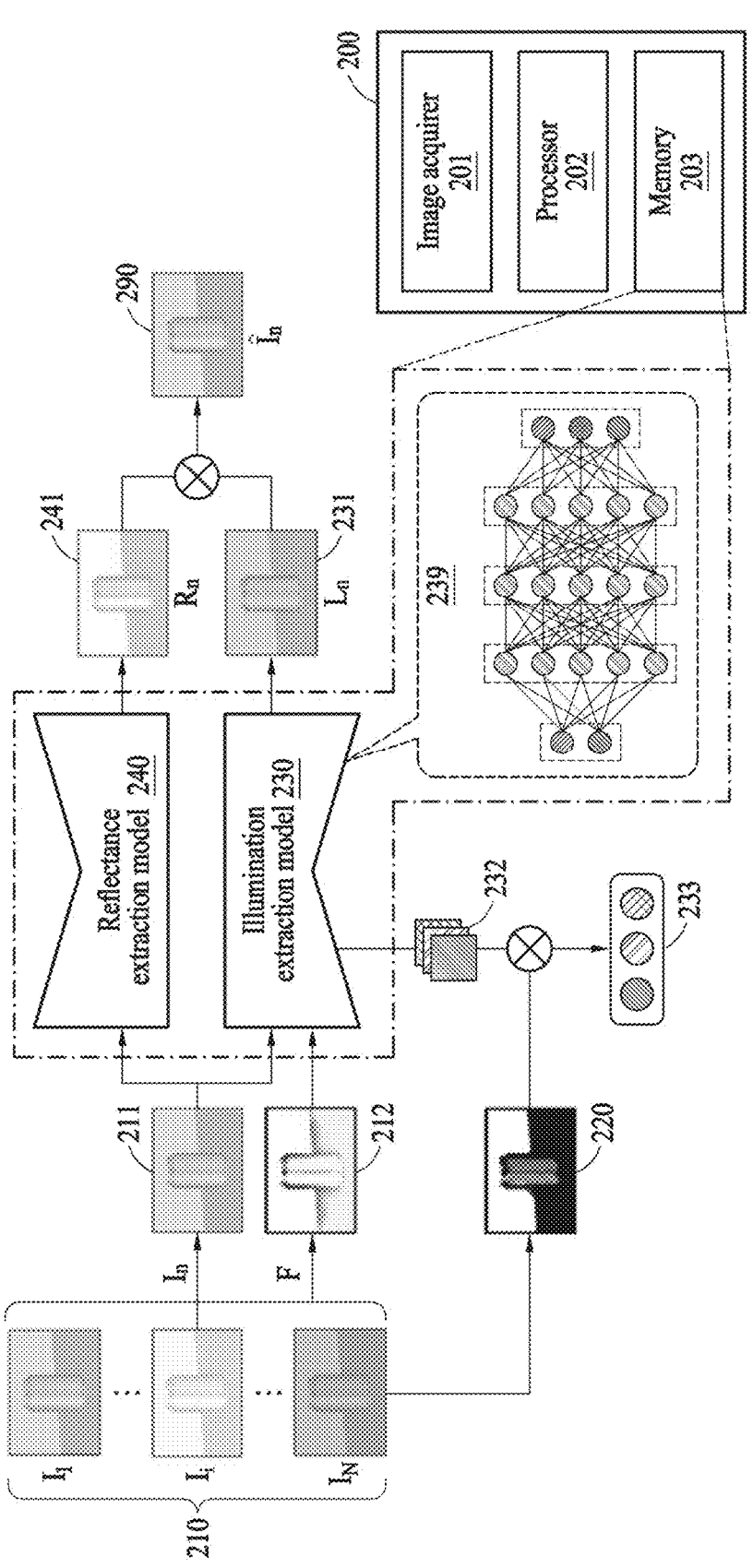
FIG. 2 illustrates an example of a computing apparatus configured to perform an image decomposition using an illumination extraction model and a reflectance extraction model.

FIG. 2 illustrates an example of a computing apparatus configured to perform an image decomposition using an illumination extraction model and a reflectance extraction model.

Referring to FIG. 2, an image processing device 200 of one or more embodiments may include an image acquirer 201 (e.g., one or more sensors such as one or more cameras), a processor 202 (e.g., one or more processors), and a memory 203 (e.g., one or more memories).

The image acquirer 201 may acquire a plurality of images 210 each having a different brightness. According to an example, the image acquirer 201 may acquire the plurality of images 210 that includes at least one image having a brightness different from that of an input image 211 of the plurality of images 210. For example, the image acquirer 201 may acquire the plurality of images 210 captured under an AC illuminant. In FIG. 2, the plurality of images 210 may include a first image $I_1$ to an $N^{th}$ image $I_N$. N denotes an integer of 2 or more and i denotes an integer of 1 or more and N or less. Herein, an example of capturing the plurality of images 210 mainly under the AC illuminant is described. However, this is provided as an example only, and as another example, referring to FIG. 9, the image acquirer 201 may acquire the plurality of images 210 each captured at a different exposure time. The image acquirer 201 may be or include, for example, a camera sensor, but is not limited thereto. The image acquirer 201 may be a communicator configured to receive the plurality of images 210 from a device that includes another camera sensor through wired communication and/or wireless communication.

The memory 203 may store an image decomposition model. The image decomposition model may be in a machine learning structure trained to output an image decomposition result from the input image 211. The input image 211 may be an $n^{th}$ image among N images. Here, n denotes an integer of 1 or more and N or less. The image decomposition model may include an illumination extraction model 230 and a reflectance extraction model 240. The illumination extraction model 230 may be in a machine learning structure trained to extract an illumination map 231 from the input image 211 and temporal correlation information 212. The temporal correlation information 212 is illustrated as F in FIG. 2. The reflectance extraction model 240 may be in a machine learning structure trained to extract a reflectance map 241 from the input image 211. For example, the image decomposition model, the illumination extraction model 230, and the reflectance extraction model 240 may include a neural network 239. The neural network 239 may be, for example, a deep neural network (DNN). The DNN may include a fully connected network, a deep convolutional network, and a recurrent neural network. The neural network 239 may perform an image decomposition that includes extraction of the reflectance map 241, extraction of the illumination map 231, and extraction of an illuminant color by mapping input data and output data in a nonlinear relationship based on deep learning. In FIG. 2, for example, the reflectance map 241 may represent an $n^{th}$ reflectance map $R_n$ of an $n^{th}$ temporal frame and the illumination map 231 may represent an $n^{th}$ illumination map $L_n$ of the $n^{th}$ temporal frame. Deep learning refers to a machine learning scheme for solving an image processing issue from a bigdata set. Input data and output data may be mapped through supervised or unsupervised learning of deep learning.

Referring to FIG. 2, the neural network 239 may include an input layer, a hidden layer, and an output layer. Each of the input layer, the hidden layer, and the output layer may include a plurality of nodes. Although it is illustrated in FIG. 2 that the hidden layer includes three layers for clarity of description, the hidden layer may include various numbers of layers (e.g., four or more layers). Also, although it is illustrated in FIG. 2 that the neural network 239 includes a separate input layer for receiving input data, the input data, for example, the input image 211 and the temporal correlation information 212, may be directly input to the hidden layer. In the neural network 239, nodes of layers excluding the output layer may be connected to nodes of a subsequent layer through links (e.g., connections) for transmitting an output signal. A number of links may correspond to a number of nodes included in the subsequent layer. Such a link may be referred to as a connecting line. An output of an activation function for weighted inputs of nodes included in a previous layer may be input to each node included in the hidden layer. A weighted input is acquired by multiplying inputs of nodes included in the previous layer by a connection weight. The connection weight may be referred to as a parameter of the neural network 239. The activation function may include sigmoid, hyperbolic tangent (tanh), and rectified linear unit (ReLU), and a nonlinearity may be formed in the neural network 239 by the activation function. Weighted inputs of nodes included in the previous layer may be input to each node included in the output layer.

For reference, a non-limiting example of a structure of the image decomposition model, the illumination extraction model 230, and the reflectance extraction model 240 is described below with reference to FIG. 4.

The processor 202 may extract the illumination map 231 for the input image 211 and an illuminant color of the input image 211 from at least one input image 211 among the plurality of images 210 and temporal correlation information of the plurality of images 210, based on the illumination extraction model 230. Also, the processor 202 may extract the reflectance map 241 for the corresponding input image 211 from the at least one input image 211 among the plurality of images 210 based on the reflectance extraction model 240.

For example, the processor 202 may acquire the plurality of images 210 from consecutive frames through the image acquirer 201. For example, each of the plurality of images 210 may have a different brightness. The processor 202 may select a single input image 211 from among the plurality of images 210. The selected input image 211 may correspond to a single temporal frame among a plurality of temporal frames. The processor 202 may also generate the temporal correlation information 212 for the plurality of images 210. A non-limiting example of generating the temporal correlation information 212 is described below with reference to FIG. 3. The processor 202 may calculate (e.g., determine) the illumination map 231 and a local color map 232 by applying the illumination extraction model 230 to the input image 211 and the temporal correlation information 212. The processor 202 may calculate the reflectance map 241 by applying the reflectance extraction model 240 to the input image 211. The processor 202 may extract, from the input image 211, the reflectance map 241 for the same temporal frame as the temporal frame of the illumination map 231, based on the reflectance extraction model 240. Also, the processor 202 may calculate an illuminant confidence map 220 and may determine an illuminant color vector 233 indicating an illuminant color based on the illuminant confidence map 220 and the local color map 232. A non-limiting example of calculating the illuminant confidence map 220 and the illuminant color vector 233 is described below with reference to FIG. 6.

The image processing device 200 of one or more embodiments may predict illuminant color information with the illumination map 231 and the reflectance map 241 based on Retinex theory. For example, the image processing device 200 may complementarily improve estimation accuracy of each piece of information by predicting the illuminant color and the illumination map 231 having a high correlation as described above. Since the image decomposition model does not depend on a prior, applicability and decomposition performance may be improved. The image processing device 200 of one or more embodiments may synthesize a further improved white balanced image 290 (e.g., $\hat{I}_n$) and a multi-exposure fusion image. For example, the image processing device 200 may generate the white balanced image 290 by applying an element-wise operation, for example, an element-wise multiplication, between the respective element values of the illumination map 231 and the reflectance map 241. However, this is provided as an example only, and the image processing device 200 may alternatively or additionally generate the white balanced image 290 from the input image 211 using the extracted illuminant color. For example, the image processing device 200 may generate the white balanced image 290 by dividing each pixel value of the input image 211 by the illuminant color vector 233.

The image processing device 200 may be applied to a camera (e.g., the image acquirer 201) using an artificial intelligence computing and/or a neural processor and server-oriented image processing in the deep image processing field. Also, the image processing device 200 of one or more embodiments may generate an image having a normalized illumination through white balance as preprocessing to reduce an object recognition confusion caused by an illumination in an image processing task that includes an image classification, an object tracking, an optical flow calculation, and/or a depth estimation.

Figure 3:
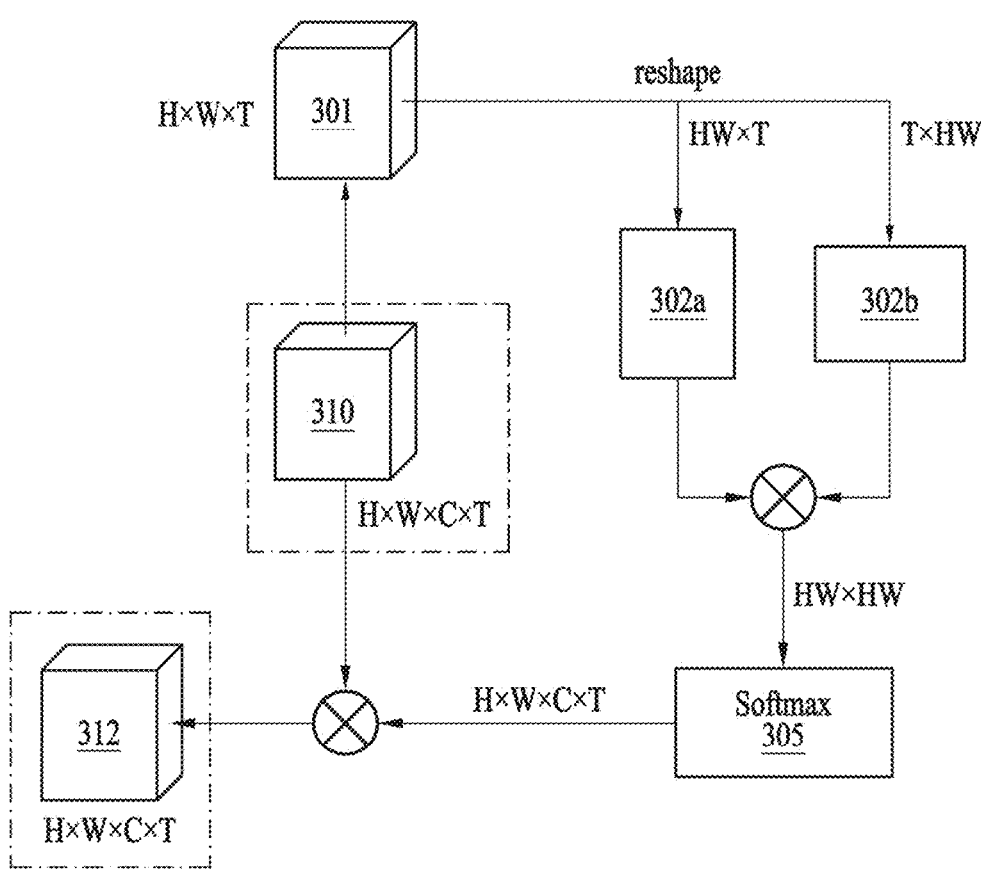
FIG. 3 illustrates an example of an operation of extracting temporal correlation information using an illumination extraction model.

FIG. 3 illustrates an example of an operation of extracting temporal correlation information (e.g., the temporal correlation information 212 of FIG. 2) using an illumination extraction model.

An image processing device of one or more embodiments may generate information (for example, temporal correlation information 312) that represents a temporal correlation between a plurality of images 310. For example, when a change in images for the same scene generally appears due to a change in illumination intensity of an illuminant, a region that varies more along a time axis may be assumed to have more illumination information. The image processing device may extract the temporal correlation information 312 to target the aforementioned region. The temporal correlation information 312 may be a map in which pixels of a portion related to an illumination change in a plurality of input images are emphasized.

For example, the image processing device may reshape data 301, generated from the plurality of images 310 based on a temporal frame, by compressing color channels of the plurality of images 310 into a single channel. For example, each of the plurality of images 310 may include pixels of a height H and a width W, and an image for each of T temporal frames may include C channel images. Here, each of H, W, T, and C denotes an integer of 1 or more. The data 301 compressed into the single channel may be H×W×T dimensional data. The image processing device may generate data 302a with a dimension of HW×T and data 302b with a dimension of T×HW by reshaping the data 301 compressed into the single channel.

The image processing device may calculate the temporal correlation information 312 from attention data generated from the reshaped data 302a and 302b and the plurality of images 310. For example, the image processing device may calculate HW×HW dimensional data by multiplying the reshaped data 302a and 302b. The image processing device may generate H×W×C×T dimensional attention data by applying a SoftMax operation 305 to the HW×HW dimensional data. The image processing device may generate the temporal correlation information 312 with a dimension of H×W×C×T by multiplying the attention data and the plurality of images 310.

The aforementioned temporal correlation information 312 may be a map in which a pixel value of a temporally attentive region is emphasized using a non-local network scheme. The temporal correlation information 312 may be calculated from the input image itself before training, and therefore a calculation amount may be minimized and a training time may be minimized.

Figure 4:
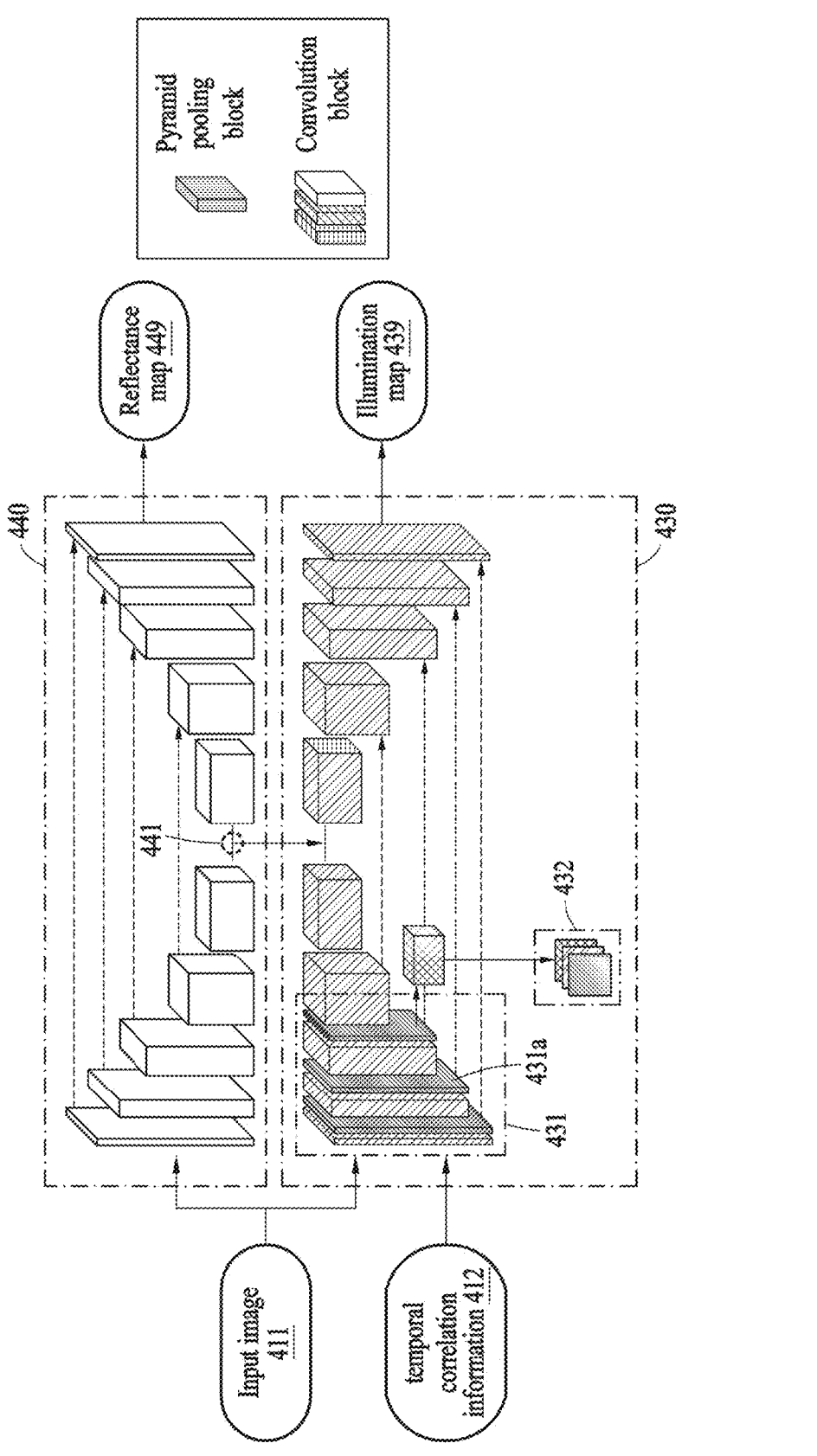
FIG. 4 illustrates an example of a structure of an illumination extraction model and a reflectance extraction model.

FIG. 4 illustrates an example of a structure of an illumination extraction model (e.g., the illumination extraction model 230 of FIG. 2) and a reflectance extraction model (e.g., the reflectance extraction model 240 of FIG. 2).

An image decomposition model according to an example may include an illumination extraction model 430 and a reflectance extraction model 440. As described above, an image processing device of one or more embodiments may extract a reflectance map 449 from an input image 411 using the reflectance extraction model 440. The image processing device may extract a local color map 432 and an illumination map 439 from the input image 411 and temporal correlation information 412 using the illumination extraction model 430.

For example, the reflectance extraction model 440 may include a neural network including at least one convolution layer and may be in an VGG16-based auto-encoder structure. The reflectance extraction model 440 may include, for example, an encoder portion and a decoder portion, and may include a shortcut connection that propagates data from a layer belonging to the encoder portion to a layer corresponding to the decoder portion. The encoder portion may include one or more layers of abstracting the input image 411 and compressing the abstracted input image 411 to a representation vector (e.g., a representation vector 441), and the decoder portion may include one or more layers of estimating the reflectance map 449 from the compressed representation vector. Here, a structure of the reflectance extraction model 440 is not limited thereto. For reference, the term "layer" used herein may also be expressed as a block. For example, the convolution layer may also be referred to as a convolution block.

Further, for example, the illumination extraction model 430 may include a neural network including at least one convolution layer and may be in an VGG16-based auto-encoder structure. The illumination extraction model 430 may include, for example, an encoder portion and a decoder portion. The encoder portion of the illumination extraction model 430 may include at least one pyramid pooling layer 431a. The pyramid pooling layer 431a may be provided between convolution layers in the encoder portion. A non-limiting example of the pyramid pooling layer 431a is described below with reference to FIG. 5. The pyramid pooling layer 431a may also be referred to as a pyramid pooling block. The illumination extraction model 430 may include a convolution layer that is connected to the pyramid pooling layer 431a and outputs the local color map 432.

Also, the image processing device may share feature data extracted from at least a portion of layers of the reflectance extraction model 440 with the illumination extraction model 430. For example, the image processing device may deliver the representation vector 441 compressed through the encoder portion of the reflectance extraction model 440 to the illumination extraction model 430 (e.g., to the decoder portion of the illumination extraction model 430).

In an example, referring to FIG. 4, the image processing device may extract the local color map 432 for estimating a color of an illuminant from some layers 431 of the encoder portion of the illumination extraction model 430. The local color map 432 may include element values of a red channel, a green channel, and a blue channel for, for example, an RGB color space as a color map in a form in which the input image 411 is abstracted. The local color map 432 may be extracted from an intermediate layer of the encoder portion through the pyramid pooling layer 431a. Therefore, a global feature may be applied to the local color map 432.

Figure 5:
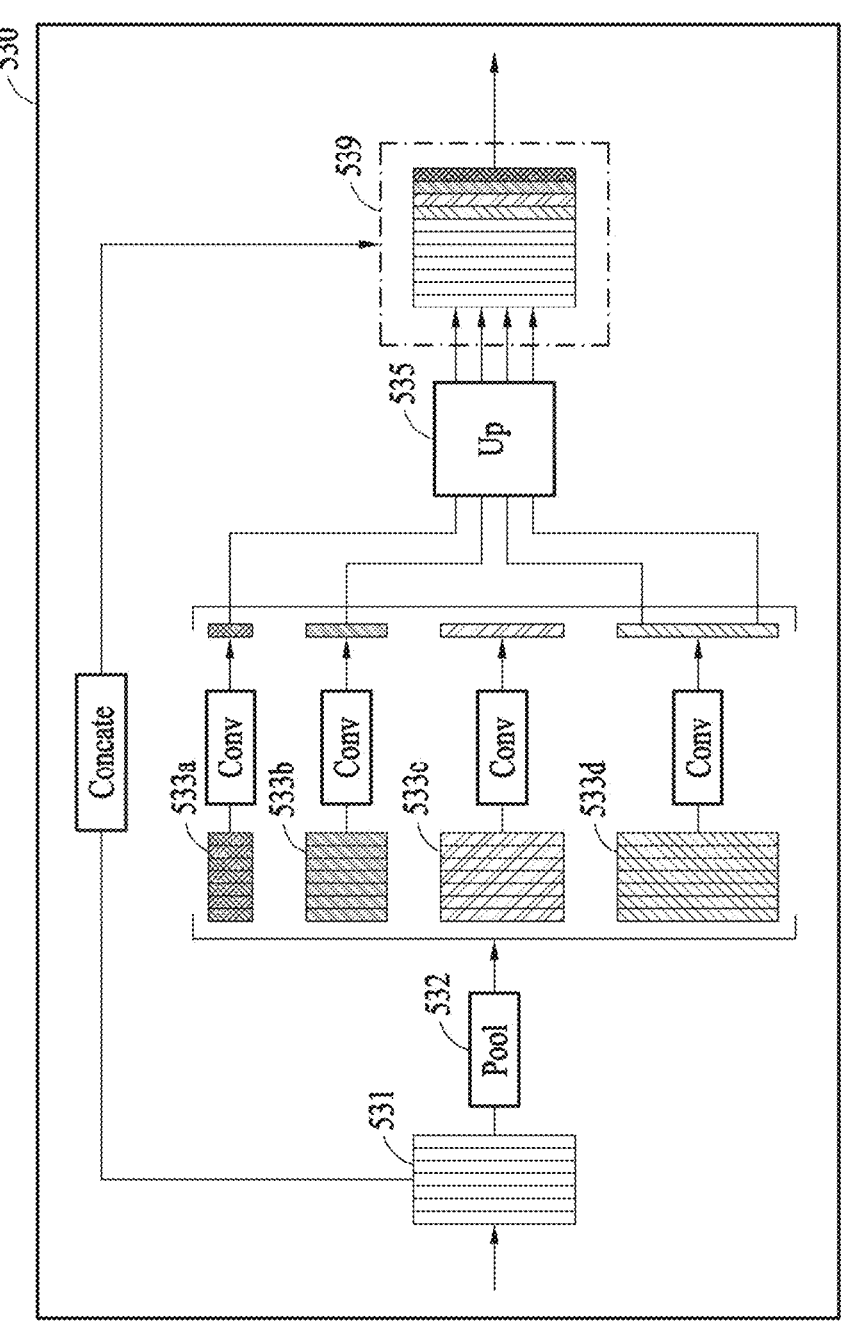
FIG. 5 illustrates an example of a pyramid pooling layer in an illumination extraction model.

FIG. 5 illustrates an example of a pyramid pooling layer (e.g., the pyramid pooling layer 431a of FIG. 4) in an illumination extraction model.

As described above with reference to FIG. 4, the illumination extraction model of one or more embodiments may include a pyramid pooling layer 530. The pyramid pooling layer 530 may be a residual block that includes a plurality of convolution layers. For example, the pyramid pooling layer 530 may propagate, to a subsequent layer, output data 539 in which a result of performing an individual convolution operation on data pooled with different sizes to input data 531 is concatenated to the input data 531. Referring to FIG. 5, an image processing device of one or more embodiments may acquire a plurality of pooled data 533a, 533b, 533c, and 533d through pooling 532 from the input data 531 that is input to the pyramid pooling layer 530. The plurality of pooled data 533a, 533b, 533c, and 533d may be pooled with different sizes. The image processing device may perform a convolution operation on each of the plurality of pooled data 533a, 533b, 533c, and 533d. The image processing device may generate data with the same size as that of the input data 531 by applying up-sampling 535 to each piece of convolution data. The image processing device may generate the output data 539 to be propagated to the subsequent layer by concatenating the input data 531 and the up-sampled data.

Figure 6:
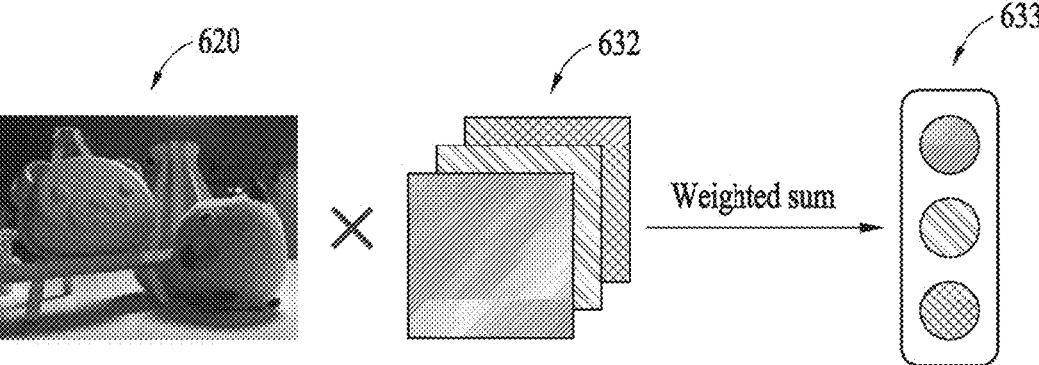
FIG. 6 illustrating an example of calculating a color vector.

FIG. 6 illustrates an example of calculating a color vector (e.g., the illuminant color vector 233 of FIG. 2).

An image processing device of one or more embodiments may extract a color map for each color channel from an input image using at least one convolution layer of an illumination extraction model. The color map for each color channel may be a local color map 632, such as the local color map 432 described above with reference to FIG. 4, for example.

The image processing device may estimate the local color map 632 indicating an illuminant color of a local region instead of extracting the illuminant color using a neural network and may calculate an illuminant color vector 633 indicating the illuminant color through a weighted sum between the local color map 632 and an illuminant confidence map.

The image processing device may calculate the illuminant color vector 633 indicating the illuminant color based on the extracted color map for each color channel and the illuminant confidence map. For example, referring to FIG. 6, the image processing device may determine a weighted sum between element values of the illuminant confidence map and element values of the color map for each color channel as a color value of a corresponding color channel. That is, the illuminant color vector 633 may include a red color value, a green color value, and a blue color value as a vector with a dimension of 3×1.

A processor of the image processing device may generate a temporal gradient map 620 as the illuminant confidence map by accumulating a difference for each temporal frame pixel by pixel from the plurality of images. In the input image, it may be assumed or determined that an area with a relatively high temporal gradient of an image (e.g., greater than or equal to a predetermined threshold) has a relatively high confidence for an illumination value.

Figure 7:
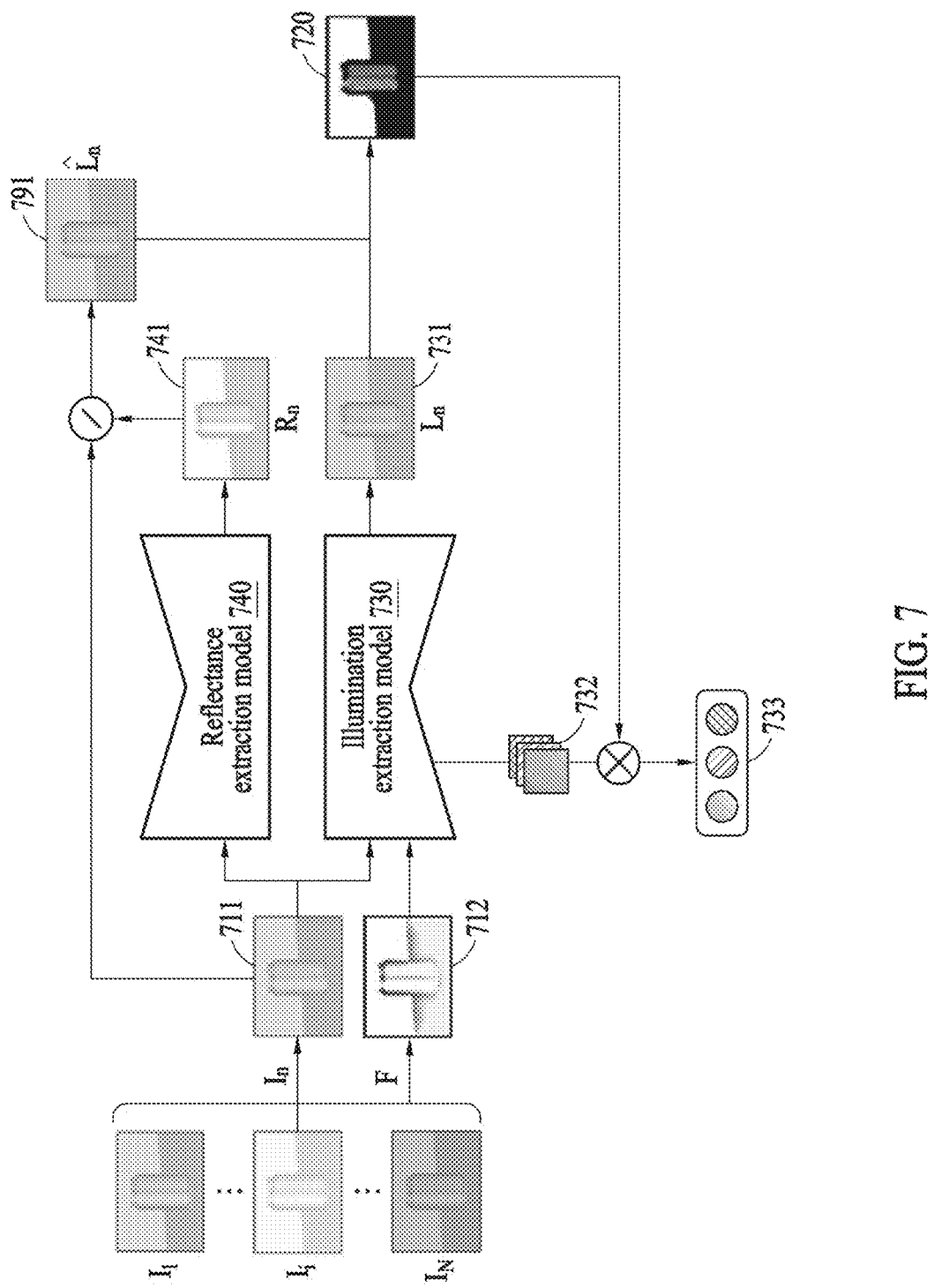
FIG. 7 illustrates an example of calculating a confidence map.

FIG. 7 illustrates an example of calculating a confidence map.

An image processing device of one or more embodiments may generate another illumination map 791 using an input image 711 and a reflectance map 741. For example, the image processing device may generate the other illumination map 791 in addition to an illumination map 731 extracted from the input image 711 and temporal correlation information 712 through an illumination extraction model 730. The image processing device may generate the other illumination map 791 using the input image 711 and the reflectance map 741 extracted through a reflectance extraction model 740. The image processing device may generate the other illumination map 791 by dividing the input image 711 by the reflectance map 741 and an illuminant color vector 733.

The image processing device may generate illuminant correlation information 720 between the illumination map 731 and the other illumination map 791 (e.g., $\hat{L}_n$) as the illuminant confidence map. For example, the image processing device may generate the illuminant correlation information 720 by calculating a correlation for each location and/or for each region between the illumination map 731 and the other illumination map 791. The illuminant correlation information 720 may be a map that represents a correlation for each element between the illumination map 731 and the other illumination map 791. The image processing device may estimate the illuminant color vector 733 from the local color map 732 using the illuminant correlation information 720 instead of using the temporal gradient map 620 of FIG. 6.

According to an example, the image processing device may generate a white balanced image by dividing the input image 711 by the illuminant color vector 733.

Figure 8:
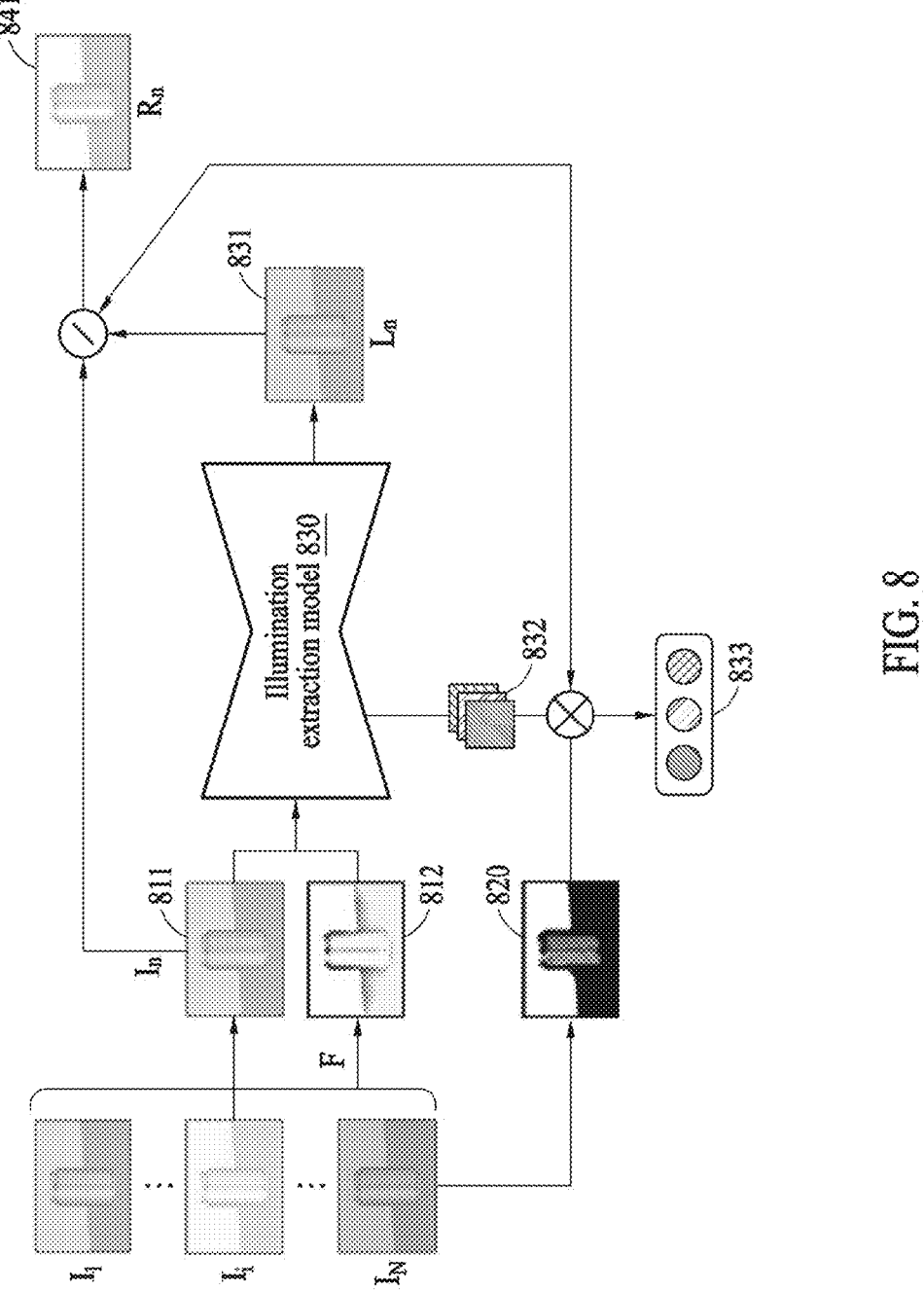
FIG. 8 illustrating an example of extracting a reflectance map using an illumination extraction model.

FIG. 8 illustrates an example of extracting a reflectance map using an illumination extraction model.

An image processing device of one or more embodiments may generate a reflectance map 841 from an input image 811 using an illumination map 831 and an illuminant color vector 833. Although an example in which an image decomposition model includes a reflectance extraction model and an illumination extraction model 830 is mainly described with reference to FIGS. 1 to 8, in another non-limiting example the image decomposition model may include the illumination extraction model 830 but not the reflectance extraction model.

The image processing device may extract the illumination map 831 from the input image 811 and temporal correlation information 812 using the illumination extraction model 830. Similarly to the aforementioned description, a local color map 832 and the illuminant color vector 833 may be extracted from a front end of the illumination extraction model 830 based on an illuminant confidence map 820. The image processing device may extract the reflectance map 841 by applying an element-wise division to the input image 811 using the illumination map 831 and the illuminant color vector 833.

The image processing device may generate a new image, for example, a white balanced image and a high dynamic range (HDR) image, using one of the extracted illumination map 831, reflectance map 841, and illuminant color vector 833, or a combination of at least two thereof.

Figure 9:
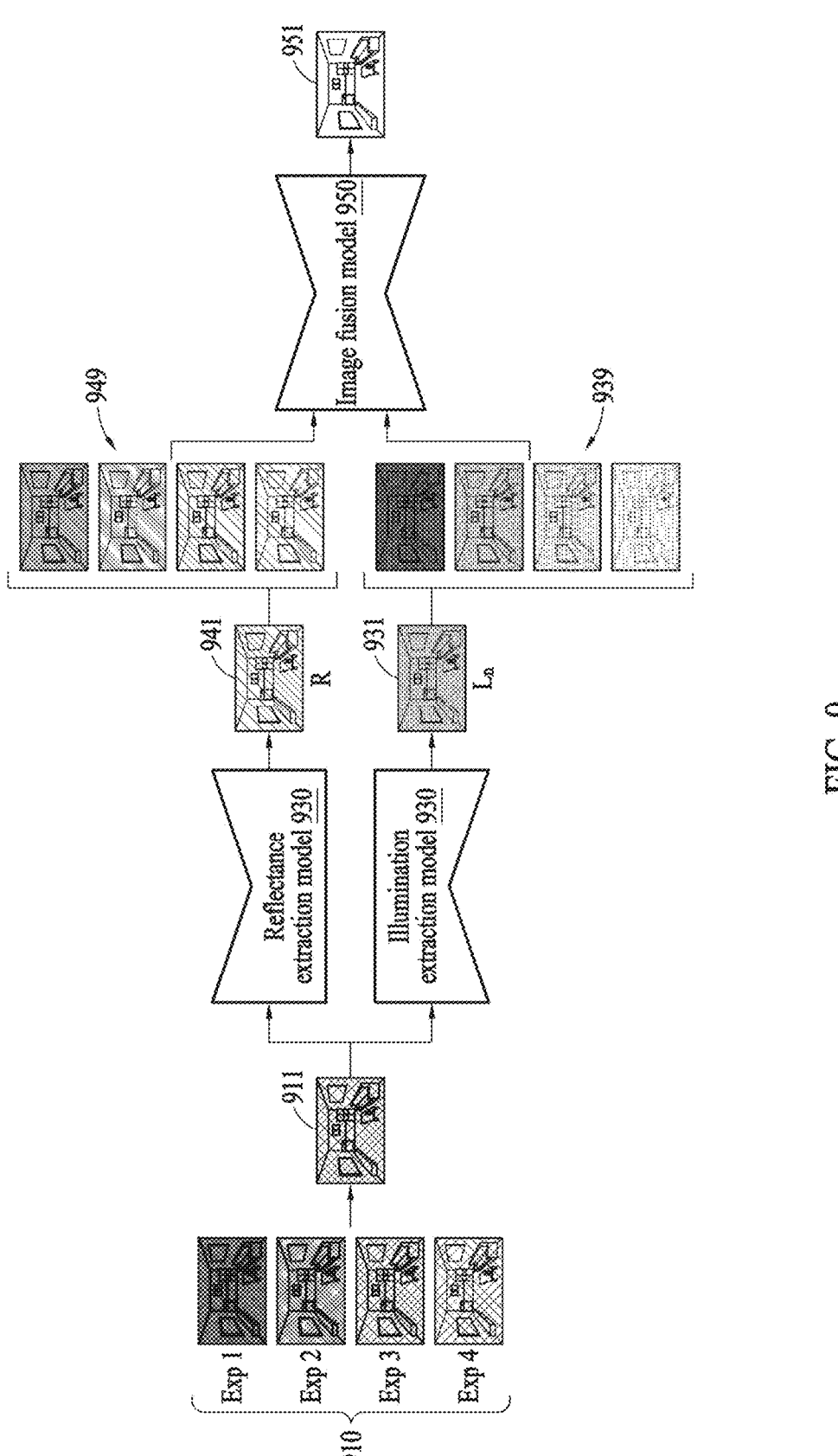
FIG. 9 illustrates an example of an operation of generating a composite image using an image decomposition model.

FIG. 9 illustrates an example of an operation of generating a composite image using an image decomposition model.

An image acquirer of one or more embodiments may acquire a plurality of images 910 each captured at a different exposure time.

An image processing device of one or more embodiments may generate a reflectance map 941 and an illumination map 931 by selecting an input image 911 from among the plurality of images 910 and by applying a reflectance extraction model 940 and an illumination extraction model 930 to the selected input image 911. The image processing device may repeat the aforementioned image decomposition operation even for another image of the plurality of images 910. For reference, although not illustrated in FIG. 9, temporal correlation information, an illuminant confidence map, and an illuminant color vector may be extracted. For reference, a brightness change pattern (e.g., a linear increase), which differs from the aforementioned AC illuminant and brightness change pattern, is present in images each captured at a multi-exposure time. Therefore, the image decomposition model may be trained with a loss function designed for the multi-exposure time.

As described above, a processor of an image processing device of one or more embodiments may generate a plurality of illumination maps 939 corresponding to the respective temporal frames from the plurality of images 910 using the illumination extraction model 930. The processor may generate a plurality of reflectance maps 949 corresponding to the respective temporal frames from the plurality of images 910 using the reflectance extraction model 940. The processor may generate a composite image 951 from the plurality of illumination maps 939 and the plurality of reflectance maps 949. For example, the processor may reconstruct an HDR image from the plurality of illumination maps 939 and the plurality of reflectance maps 949, based on an image fusion model 950. The image fusion model 950 may be a machine learning model designed and trained to output the HDR image from the plurality of illumination maps 939 and the plurality of reflectance maps 949. However, it is provided as an example only and generation of the composite image 951 is not limited thereto. The image processing device may reconstruct the composite image 951 by multiplying an average illumination image of the illumination maps 939 and an average reflectance image of the reflectance maps 949. Also, the composite image 951 is not limited to the HDR image. An image having a white balance, an illuminance, a color, an exposure time, and a dynamic range designated by a user may be generated through fusion of the illumination maps 939 and the reflectance maps 949.

FIGS. 10 to 13 illustrate examples of training an image decomposition model.

Figure 10:
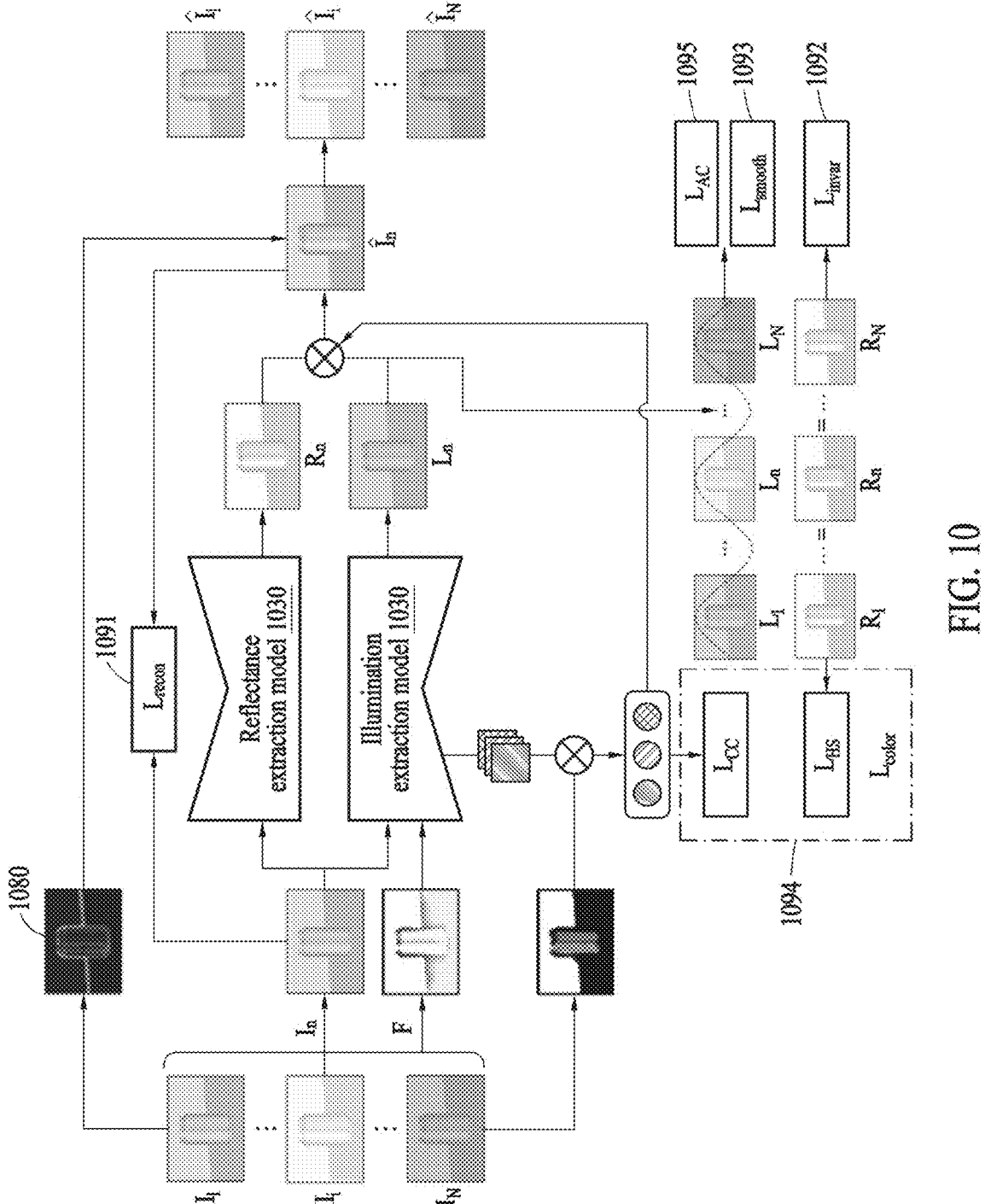
FIGS. 10 to 13 illustrate examples of training an image decomposition model.

FIG. 10 illustrates an overall training and angular loss of the image decomposition model. For reference, a structure of FIG. 10 is the same as the structure of FIG. 2 and a loss described in FIG. 10 is not limited to being applied only to FIG. 2. For example, losses described in FIG. 10 may be used for training even in structures of FIGS. 7 to 9. Some losses may be omitted or added based on a design.

An image model building device (e.g., an image processing device) of one or more embodiments may represent a device that builds the image decomposition model. For example, the image model building device may generate and train the image decomposition model (for example, an illumination extraction model 1030 and a reflectance extraction model 1040). An operation of building the image decomposition model may include an operation of generating and training the image decomposition model. The image processing device may decompose an input image into an illumination map, a reflectance map, and an illuminant color based on the image decomposition model. However, it is provided as an example only and the image model building device may be integrated with the image processing device.

Figure 11:
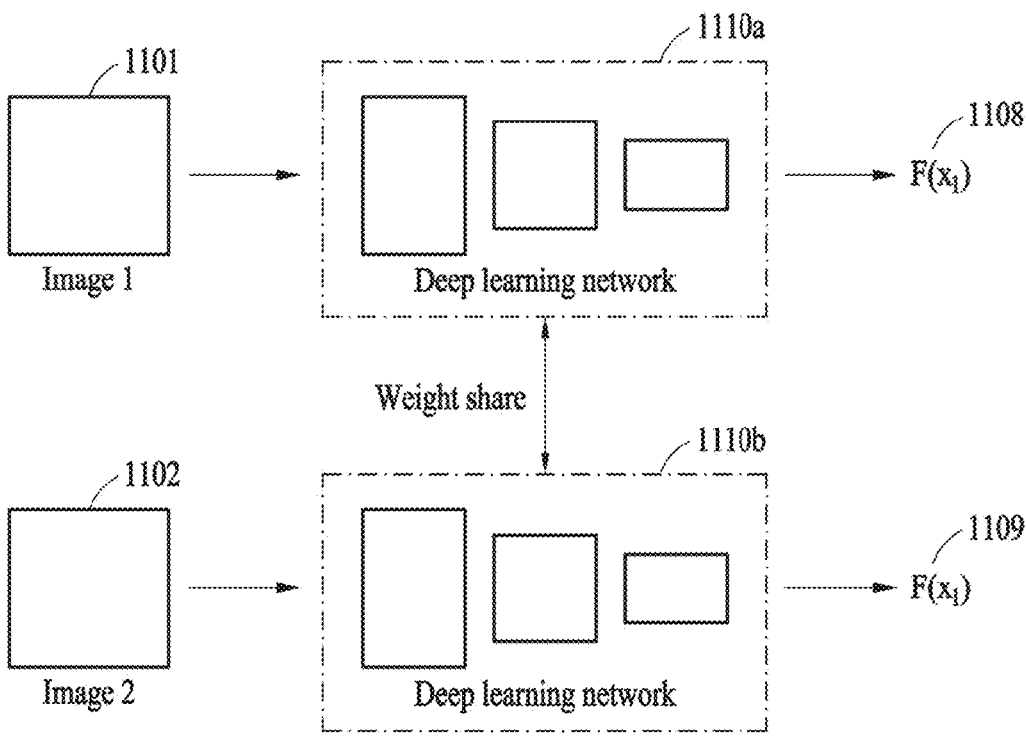

Referring to FIG. 11, the image model building device may perform Siamese training. For example, the image model building device may build first and second image decomposition models 1110a and 1110b (e.g., a neural network) that share the same weight parameter for a first training image 1101 and a second training image 1102. The image model building device may backward propagate a loss calculated using a first temporary output 1108 output from the first image decomposition model 1110a and a second temporary output 1109 output from the second image decomposition model 1110b. For example, the image model building device may calculate losses by applying a Siamese network to an image of each temporal frame and may backward propagate the losses at a time. Since a test may be performed regardless of a frame number of an image, training may be performed in a direct current (DC) illuminant environment, a natural light environment, and a single image as well as in an AC illuminant environment.

According to an example, the image model building device may perform training using a total loss including a plurality of losses. The image model building device may repeat parameter update of the image decomposition model until the total loss is converged and/or until the total loss becomes to be less than a critical loss. The total loss may be represented as, for example, the following Equation 1.

$$L_{tot} = L_{recon} + L_{invar} + L_{smooth} + L_{color} + L_{AC}$$

In Equation 1, $L_{tot}$ denotes a total loss, $L_{recon}$ denotes a reconstruction loss 1091 between an input image and a reconstructed image, $L_{invar}$ denotes an invariant loss 1092 between reflectance maps, $L_{smooth}$ denotes smooth loss 1093 for a form of an illumination, $L_{color}$ denotes a color loss 1094, and $L_{AC}$ denotes a brightness fitting loss 1095.

The reconstruction loss 1091 refers to a loss function that represents a level of satisfaction of an illumination map, a reflectance map, and an illuminant color acquired through the entire network for Retinex theory and may be designed as the following Equation 2, for example.

$$L_{recon} = \sum_{i=1}^{N} \sum_{j=1}^{N} \alpha_{ij} M_j \| R_i * L_j * c_j - I_j \|_1 \qquad \text{Equation 2}$$

In Equation 2, $M_j$ denotes an intensity mask 1080 corresponding to a $j^{th}$ temporal frame among N temporal frames, $I_j$ denotes an input image corresponding to the $j^{th}$ temporal frame, $R_i$ denotes a reflectance map corresponding to an $i^{th}$ temporal frame, $L_j$ denotes an illumination map corresponding to the $j^{th}$ temporal frame, c denotes an illuminant color vector corresponding to the $j^{th}$ temporal frame, and $a_{ij}$ denotes an arbitrary coefficient. In FIG. 10, $\hat{I}_i$ may be calculated from a convolution operation of the reflectance map $R_i$, the illumination map $L_j$, and the illuminant color vector $c_j$. * denotes the convolution operation. The above Equation 2 may represent a constraint loss using an L1 function such that a convolution multiplication of the reflectance map, the illumination map, and the illuminant color vector becomes the same as the input image. Here, to prevent a degradation in accuracy in a light saturation region, the illumination extraction model 1030 may be trained using a loss that includes the reconstruction loss 1091 calculated between a temporary output image and the input image based on the illumination map and the reflectance map, for a remaining region excluding a saturation region determined based on an intensity mask 1080. That is, in Equation 2, the intensity mask 1080 may have a value of 0 for the saturation region and the image model building device may exclude calculation of the reconstruction loss 1091 for the saturation region.

The invariant loss 1092 may be designed as the following Equation 3, for example.

$$L_{invar} = \sum_{i=1}^{N} \sum_{j=1, i \neq j}^{N} \|R_i - R_j\|_2^2 \qquad \text{Equation 3}$$

Equation 3 may represent a mean square error (MSE) loss designed such that reflectance maps ($R_i$, $R_j$) of all temporal frames of a plurality of images may be the same.

The smooth loss 1093 may be designed as the following Equation 4, for example.

$$L_{smooth} = \sum_{i=1}^{N} \|\nabla L_i\|_2^2 \qquad \text{Equation 4}$$

Equation 4 may be designed as a total variation L2 regulizer to reflect a smooth nature of an illumination.

Figure 12:
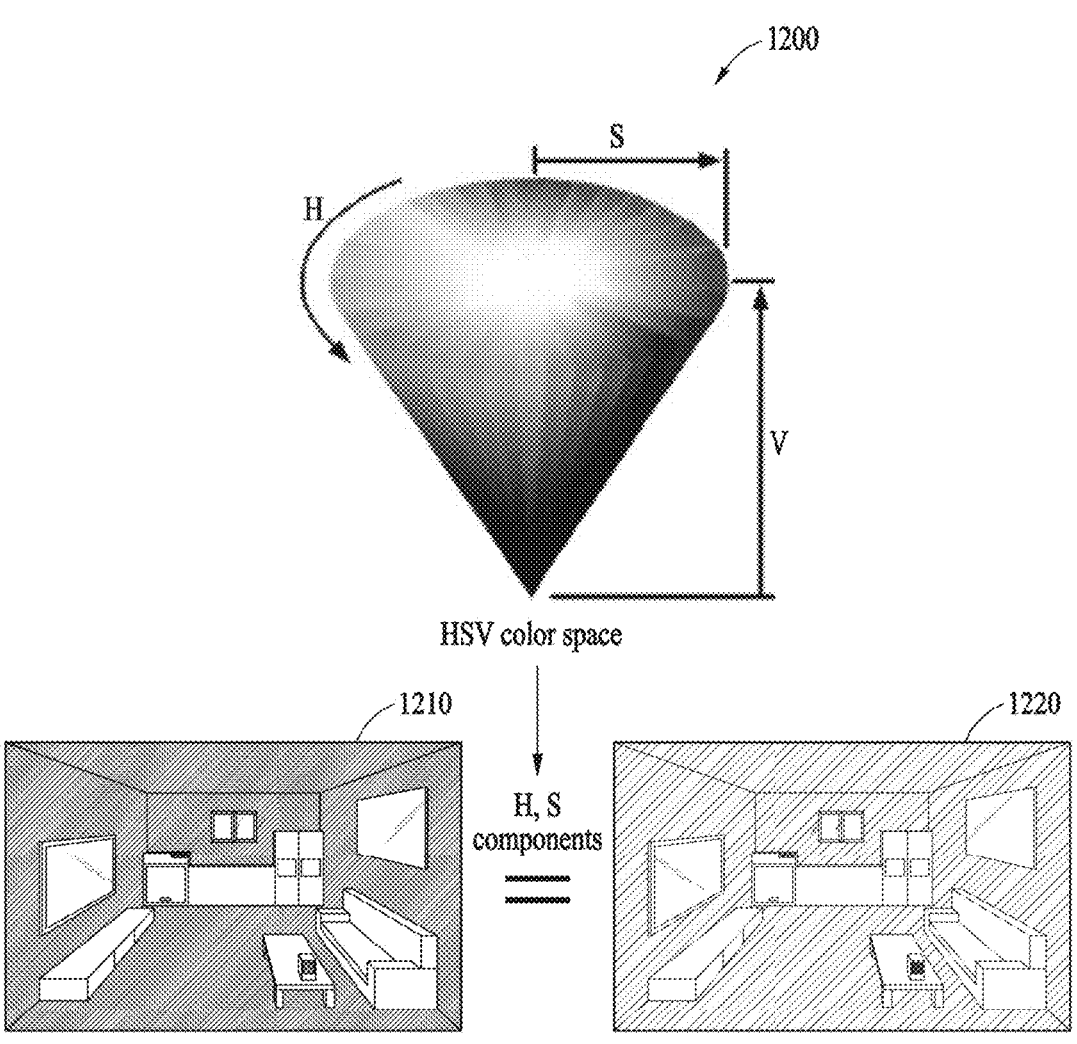

FIG. 12 describes the color loss 1094.

The color loss 1094 may be designed as the following Equation 5, for example.

$$L_{color} = L_{CC} + L_{HS} \qquad \text{Equation 5:}$$

In Equation 5, $L_{cc}$ denotes a color constancy loss function and $L_{HS}$ denotes a hue saturation loss function.

The color constancy loss function may be designed as the following Equation 6 and Equation 7, for example.

$$L_{cc} = \sum_{i=1}^{N} \cos^{-1} \frac{\Gamma_g \cdot \Gamma_t}{\|\Gamma_g\|\|\Gamma_t\|} \qquad \text{Equation 6}$$

$$\Gamma_t = \text{mean}\,(M_g * C_{local}) \qquad \text{Equation 7}$$

Equation 6 may represent an error between an illumination estimated using the illumination extraction model 1030 and an actual illumination. Equation 7 may represent an illuminant color vector $\Gamma_t$ for a $t^{th}$ temporal frame calculated through a weighted sum between an estimated local color map $C_{local}$ and a temporal gradient map $M_g$. The above Equation 6 may represent an angular error between the color vector $\Gamma_t$ and a ground truth illumination vector $\Gamma_g$.

Also, according to an example, the illumination extraction model 1030 may be trained using a hue saturation loss $L_{HS}$ based on a hue difference and a saturation difference between a white balanced image in which an illumination component is removed from an image and a reflectance map. The hue saturation loss LHS may be represented as the following Equation 8, for example.

$$L_{HS} = \sum_{i=1}^{N} \left\| H(R_i) - H(I_i^{WB}) \right\|_1 + \left\| S(R_i) - S(I_i^{WB}) \right\|_1 \qquad \text{Equation 8}$$

Equation 8 may be a loss function that represents a difference in hue and saturation between a reflectance map and an input image. Hue and saturation may appear same regardless of an illumination, in an input image 1210 in which an illumination component is removed and a reflectance map 1220 based on an HSV color space 1200. The input image (e.g., a white balanced image) ($I_{WB}$) 1210 in which an illumination is removed using a ground truth illumination value and the reflectance map ($R_i$) 1220 may be converted to a hue value H(x) and a saturation value S(x), respectively. The image model building device may calculate an L1 loss such that a hue component and a saturation component between two images may be the same.

Figure 13:
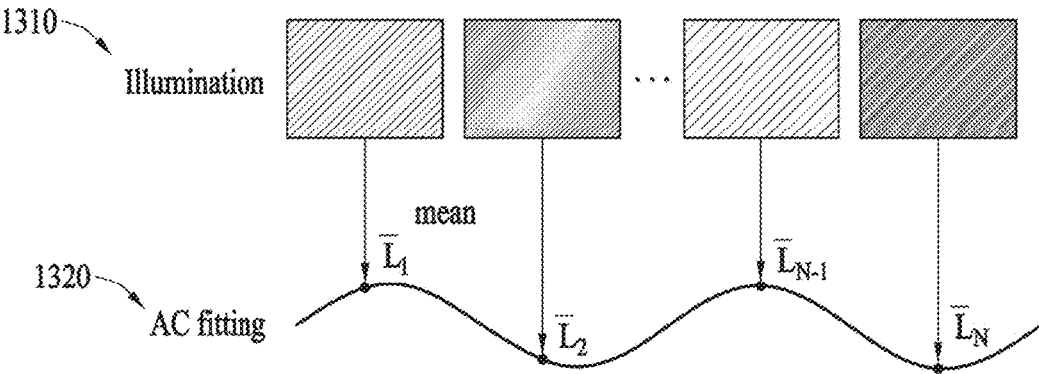

The brightness fitting loss 1095 is described with reference to FIG. 13.

According to an example, the illumination extraction model 1030 may be trained using a loss that includes the brightness fitting loss 1095 between a brightness of an illumination map and an illuminant extracted for a plurality of temporal frames. The brightness fitting loss 1095 may be designed as the following Equation 9 and Equation 10, for example.

$$L_{AC} = \left( \overline{L}_t - g_t(\Theta) \right)^2 \qquad \text{Equation 9}$$

$$g_t(\Theta) = \sin\left( \frac{4\pi f_{ac} t}{f_{cam}} + \phi \right) + \text{off} \qquad \text{Equation 10}$$

In Equation 9, $\hat{L}_t$ denotes a mean of illumination values 1310 in an illumination map of the $t^{th}$ temporal frame. Equation 10 refers to a function that represents an illumination intensity curve 1320 according to a Gauss-Newton method that models a sinusoidal regression. Equation 9 may represent a difference between the mean of illumination values 1310 and the illumination intensity curve 1320 according to an illumination phase of an illuminant according to the Gauss-Newton method.

Figure 14:
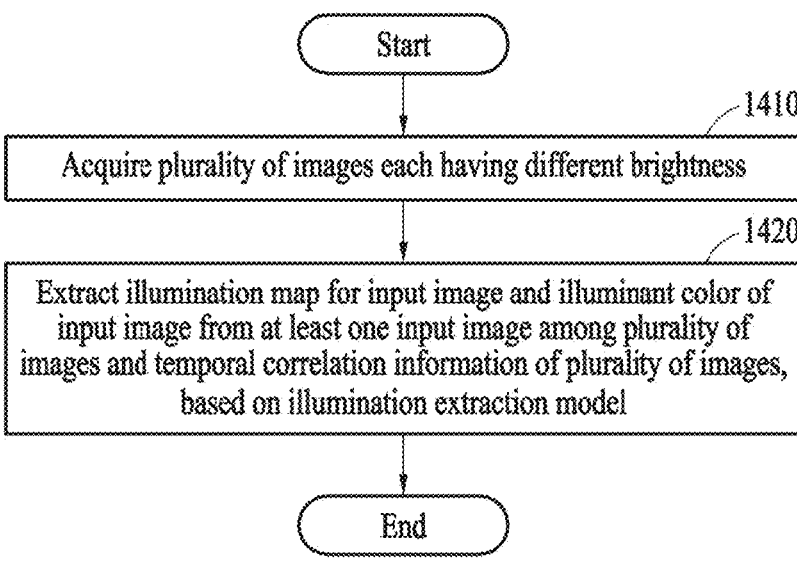
FIG. 14 illustrates an example of an image processing device.

FIG. 14 is a flowchart illustrating an example of an image processing method.

In operation 1410, an image processing device of one or more embodiments may acquire a plurality of images each having a different brightness.

In operation 1420, the image processing device may extract an illumination map for an input image and an illuminant color of the input image from at least one input image among the plurality of images and temporal correlation information of the plurality of images, based on an illumination extraction model.

However, without being limited to the operations of FIG. 14, the image processing device may perform one of the operations described above with reference to FIGS. 1 to 13 or a combination of at least two thereof in time series and/or in parallel.

The image processing device of one or more embodiments may also perform white balancing, illumination component estimation, and reflectance component estimation. Also, the image processing device may represent a further improved white balancing performance and an accurate estimation performance. The image processing device may represent a performance robust against artifact and low illuminance noise that may occur around a strong illumination component.

The illuminants, high-speed cameras, image processing devices, image acquirers, processors, memories, illuminant 110, high-speed camera 120, image processing device 200, image acquirer 201, processor 202, memory 203, and other apparatuses, devices, units, modules, and components described herein with respect to FIGS. 1-14 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A device with image processing, the device comprising:
an image acquirer configured to acquire a plurality of images, each having a different brightness; and
one or more processors configured to, based on an illumination extraction model, extract an illumination map and an illuminant color for a single input image of the plurality of images, and generate temporal correlation information indicating illumination changes across the plurality of images,
wherein the generating of the temporal correlation information comprises compressing color channels of the plurality of images into a single channel representation that represents values of the color channels, and
wherein, for the generating of the temporal correlation information, the one or more processors are configured to:
reshape a dimension of the single channel into a different dimension; and
determine temporal correlation information from attention data generated from the reshaped single channel and the plurality of images.

2. The device of claim 1, wherein the image acquirer is configured to acquire the plurality of images including one or more images having a brightness different from that of the input image.

3. The device of claim 1, wherein, for the generating of the illumination map and the illuminant color for the input image, the one or more processors are configured to:
extract a color map for each color channel from the input image using one or more convolution layers of the illumination extraction model; and
determine an illuminant color vector indicating the illuminant color based on the extracted color map for each color channel and an illuminant confidence map.

4. The device of claim 3, wherein the one or more processors are configured to generate a reflectance map from the input image using the illumination map and the illuminant color vector.

5. The device of claim 3, wherein the one or more processors are configured to generate a temporal gradient map as the illuminant confidence map by accumulating a difference for each temporal frame pixel by pixel from the plurality of images.

6. The device of claim 3, wherein the one or more processors are configured to:
generate another illumination map using the input image and a reflectance map; and
generate illuminant correlation information between the illumination map and the other illumination map as the illuminant confidence map.

7. The device of claim 1, wherein the illumination extraction model includes a pyramid pooling layer of propagating, to a subsequent layer, output data in which a result of performing an individual convolution operation on data pooled with different sizes to input data is concatenated to the input data.

8. The device of claim 1, wherein the one or more processors are configured to generate a white balanced image from the input image using the extracted illuminant color.

9. The device of claim 1, wherein the one or more processors are configured to extract, from the input image, a reflectance map for a same temporal frame as a temporal frame of the illumination map based on a reflectance extraction model.

10. The device of claim 9, wherein the one or more processors are configured to share feature data extracted from at least a portion of layers of the reflectance extraction model with the illumination extraction model.

11. The device of claim 1, wherein the image acquirer is configured to acquire the plurality of images captured under an alternating current (AC) illuminant.

12. The device of claim 1, wherein the image acquirer is configured to acquire each of the plurality of images at a different exposure time.

13. The device of claim 1, wherein the processor is configured to:
generate a plurality of illumination maps corresponding to respective temporal frames from the plurality of images using the illumination extraction model;
generate a plurality of reflectance maps corresponding to the respective temporal frames from the plurality of images using a reflectance extraction model; and
generate a composite image from the plurality of illumination maps and the plurality of reflectance maps.

14. The device of claim 13, wherein the processor is configured to reconstruct a high dynamic range (HDR) image from the plurality of illumination maps and the plurality of reflectance maps based on an image fusion model.

15. A method with image processing, the method comprising:
acquiring a plurality of images each having a different brightness;
generating, based on an illumination extraction model and generated temporal correlation information indicating illumination changes across the plurality of images, an illumination map and an illuminant color for a single input image of the plurality of images,
wherein the generating of the temporal correlation information comprises compressing color channels of the plurality of images into a single channel representation that represents values of the color channels, and
wherein the generating of the temporal correlation information comprises:
reshaping a dimension of the single channel into a different dimension; and
determining temporal correlation information from attention data generated from the reshaped single channel and the plurality of images.

16. The method of claim 15, wherein the generating of the illumination map and the illuminant color for the single input image comprises:

extracting a color map for each color channel from the input image using one or more convolution layers of the illumination extraction model; and determining an illuminant color vector indicating the illuminant color based on the extracted color map for each color channel and an illuminant confidence map.

17. The method of claim 15, wherein the generating of the illumination map and the illuminant color for the single input image comprises propagating, from a pyramid pooling layer of the illumination extraction model to a subsequent layer, output data in which a result of performing an individual convolution operation on data pooled with different sizes to input data is concatenated to the input data.

18. The method of claim 15, further comprising training the illumination extraction model based on a loss determined based on either one or both of the illumination map and the illuminant color.

19. A non-transitory computer-readable storage medium storing instructions that, when executed by one or more processors, configure the one or more processors to perform the method of claim 15.

20. A method with image processing, the method comprising:

generating, based on a generated temporal correlation information, an illumination map and an illuminant color of a single input image among a plurality of images, each having a different brightness, using an illumination extraction model;

determining an illuminant color vector of the illuminant color based on a color map extracted for each color channel from the input image using a portion of the illumination extraction model;

generating a reflectance map of the input image based on the illumination map and the illuminant color vector; and generating a white balanced image of the input image based on the illumination map and the reflectance map, wherein the generating of the temporal correlation information comprises:

reshaping a dimension of the single channel into a different dimension; and determining temporal correlation information from attention data generated from the reshaped single channel and the plurality of images.

21. The method of claim 20, wherein the generating of the reflectance map comprises applying an element-wise division to the input image using the illumination map and the illuminant color vector.

22. The method of claim 20, wherein the illumination extraction model comprises an encoder portion and a decoder portion, and the color map generated for each color channel from the input image is output from a convolutional layer of the encoder portion.

* * * * *